(12) United States Patent
Sakamoto

(10) Patent No.: US 7,301,577 B2
(45) Date of Patent: *Nov. 27, 2007

(54) DIGITAL CAMERA WITH A COLLAPSIBLE LENS BARREL

(75) Inventor: Takamasa Sakamoto, Osaka (JP)

(73) Assignees: Asia Optical Co., Inc., T.E.P.E. (JP); OPTEK Corporation, Osaka (JP)

( * ) Notice: Subject to any disclaimer, the term of this patent is extended or adjusted under 35 U.S.C. 154(b) by 750 days.

This patent is subject to a terminal disclaimer.

(21) Appl. No.: 10/746,080

(22) Filed: Dec. 24, 2003

(65) Prior Publication Data

US 2004/0227844 A1 Nov. 18, 2004

(30) Foreign Application Priority Data

May 15, 2003 (JP) .............................. 2003-136833

(51) Int. Cl.
*H04N 5/225* (2006.01)
*G02B 15/14* (2006.01)

(52) U.S. Cl. ..................... 348/340; 359/695; 359/700

(58) Field of Classification Search ............... 396/349, 396/72, 73; 348/335, 340; 359/694, 695, 359/699, 700
See application file for complete search history.

(56) References Cited

U.S. PATENT DOCUMENTS

| | | | | |
|---|---|---|---|---|
| 4,864,338 A | * | 9/1989 | Wakabayashi | ............... 396/349 |
| 6,031,998 A | * | 2/2000 | Shono | ............... 396/75 |
| 6,366,323 B1 | * | 4/2002 | Shono | ............... 348/340 |
| 6,978,089 B2 | * | 12/2005 | Nomura et al. | ............... 396/75 |
| 7,019,915 B2 | * | 3/2006 | Sakamoto | ............... 359/695 |
| 2004/0151490 A1 | * | 8/2004 | Nomura | ............... 396/349 |
| 2004/0179127 A1 | * | 9/2004 | Omiya et al. | ............... 348/345 |
| 2004/0179130 A1 | * | 9/2004 | Omiya et al. | ............... 348/361 |
| 2004/0189852 A1 | * | 9/2004 | Omiya et al. | ............... 348/335 |

* cited by examiner

*Primary Examiner*—Lin Ye
*Assistant Examiner*—Jason Whipkey
(74) *Attorney, Agent, or Firm*—Alan Kamrath; Kamrath & Associates P.A.

(57) ABSTRACT

A digital camera can retain its optical performance and has a particularly slim closed status. The digital camera (1) includes two lens groups (51, 52) installed in a collapsible lens barrel (3*a*), a focus lens (44), and a CCD (42) generating an image. An evading mechanism carries the front parts of the lens groups to rotate about a rotary axis parallel to the optical axis and placing the front parts beside the image sensor. When the collapsible lens barrel (3*a*) is retracted in the housing of the digital camera (1), the first lens group (51) and the second lens group (52) are rotated around a central axis J(2) parallel to the optical axis J(1) and are located beside the CCD (42). Thus, the axes of the first, second lens groups (51, 52) are prevented from being offset, and a thin digital camera (1) is obtained.

6 Claims, 5 Drawing Sheets

DIGITAL CAMERA WITH A COLLAPSIBLE LENS BARREL

BACKGROUND OF THE INVENTION

1. Field of the Invention

The present invention relates to a digital camera with a collapsible lens barrel.

2. Description of Related Art

Recently, in addition to the promotion of pixel quantity and zoom ratio, digital cameras have become even thinner than before. An effective means to minimize the thickness of the digital camera is to reduce clearances between lens sets and a picture pick-up device when the digital camera is switched off. Thus, the digital camera is generally provided with a telescopic lens frame which can extend out and retract into a camera body.

In the prior art, a non-patent document (titled "Digital CAPA", page 20-22, No. 3, Vol. 19, Mar. 1, 2003, published by Study & Research Institute, Japan,) discloses a digital camera with a collapsible lens barrel. The method for minimizing the thickness of the digital camera is to move the second lens set beside the picture pick-up device while the lens barrel is retracted.

However, the performance of the digital camera not only depends on the pixels of image sensor and the zoom ratio, but also depends on the performance of the optical system. For the optical system of general digital cameras, the alignment of the first and second lens sets is greatly related to the optical performance. The method disclosed in the non-patent document will cause the optical axis of the second lens set tilt or misalignment, when the second lens set is moved beside the image sensor. Therefore, the prior art still has some problem, which can not be solved.

Therefore, the invention provides a compact digital camera and obviates the aforementioned problems.

SUMMARY OF THE INVENTION

The main objective of the invention is to provide a digital camera with a minimized thickness and high optical performance.

The invention provides a digital camera, which includes a plurality of lens groups moving in an optical axis to change their relative positions; a collapsible lens barrel loaded with the lens groups; an image sensor receiving beams traveling through the lens groups, and outputting image signals; and an evading mechanism carrying front parts of the lens groups to rotate about a rotary axis parallel to the optical axis and locating front parts beside the image sensor when the collapsible lens barrel is retracted in the housing of the digital camera.

The invention provides a digital camera, wherein the lens groups includes a first lens group, a second lens group and a third lens group sequentially, and the front parts of the lens groups is composed of the first and second lens groups.

The invention provides a digital camera, wherein the third lens group is a focus lens.

The invention provides a digital camera, wherein the rotary axis is the central axis of the collapsible lens barrel, and the first and second lens groups are rotated about the rotary axis when the collapsible lens barrel is retracted in the housing of the digital camera.

The invention provides a digital camera further including a motor, which drives the lens groups to move back and forth in the optical axis during operation, and retracts the collapsible lens barrel in the housing of the digital camera by rotating about the rotary axis after turning off the digital camera.

The invention provides a digital camera further including a fixed barrel to support the collapsible lens barrel. In addition, the evading mechanism is a barrel-cam mechanism between the collapsible lens barrel and the fixed barrel.

The invention provides a digital camera, wherein the collapsible lens barrel has a first barrel containing the first lens group, a second barrel containing the second lens group and the first barrel, and a third barrel containing the second barrel and held by the fixed barrel.

The digital camera of the invention provides the desired optical performance and has a minimized thickness.

The digital camera of the invention prevents the optical axes of the first and second lens groups from misalignment.

The digital camera of the invention has a simple structure.

The digital camera of the invention has a minimized thickness.

DESCRIPTION OF THE INVENTION

Figure 1:
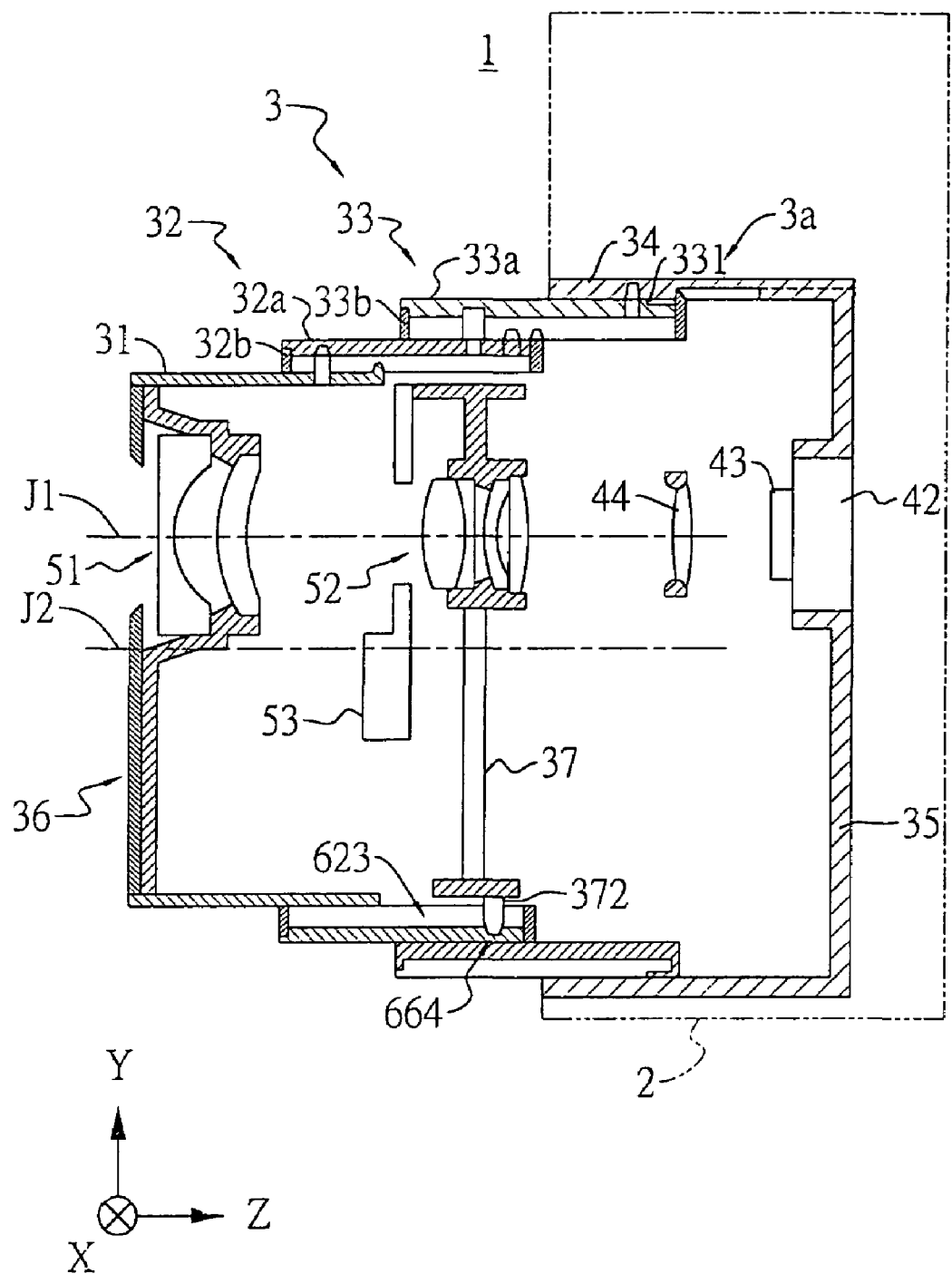
FIG. 1 is a cross-sectional view of a digital camera disclosed in the invention.

FIG. 1 is a cross-sectional view of a digital camera 1 disclosed in an embodiment of the invention. After the beams from an object (namely, the opposite direction of Z axis in FIG. 1) travel through a plurality of movable lens groups, the digital camera 1 takes a picture of the object (not shown) by an image sensor receiving beams from the object (namely, the opposite direction of the Z axis in FIG. 1).

Along the Z axis shown in FIG. 1, the digital camera 1 has a housing 2, and a fixed barrel 34 with a central axis J2 is mounted in the housing 2. An image sensor arranged in two-dimension, such as a charge-coupled device (CCD) 42, is located at rear end 35 of the fixed barrel 34. A low pass filter 43 is positioned between the CCD 42 and the fixed barrel 34.

From the object side, a first lens group 51, a second lens group 52 and a third lens group (namely focus lens group) 44 are sequentially installed in the digital camera 1. Along the Z axis, the first lens group 51, second lens group 52, focus lens 44 and CCD 42 are sequentially arranged in the optical axis J1. The zoom ratio is altered by moving the first lens group 51 and the second lens group 52 in the optical axis J1. The focus lens 44 is also moved in the optical axis J1 so as to fit the focal plane to the sensing surface of the CCD 42. The CCD 42 receives the beams from the object and outputs electronic signals, and then the electronic signals are stored in a memory (not shown).

From the object side, the digital camera 1 further has a first barrel 31, a second barrel 32 and a third barrel 33, and the first 31, second 32 and third barrels 33 are concentric and has a central axis J2 parallel with the optical axis J1. In addition, the first lens group 51 and the second lens group 52 are contained in the first 31, second 32 and third barrels 33. The first barrel 31 is held by the second barrel 32, the second barrel 32 is held by the third barrel 33, and the third barrel 33 is held by the fixed barrel 34. The first barrel 31, second barrel 32 and third barrel 33 (further including the fixed barrel 34 or not) constitute a collapsible lens barrel 3 to sink the first lens group 51, second lens group 52 and focus lens 44 in the housing 2. The second barrel 32 is composed of a first outer tube 32a and a first inner tube 32b, and the third barrel 33 is composed of a second outer tube 33a and a second inner tube 33b.

FIG. 1 schematically illustrates an interior structure of a collapsible lens barrel 3. The structure including the collapsible lens barrel 3 and the fixed barrel 34 are named as lens unit 3a.

A shelter 36 of objective side is mounted at a front end of the first barrel 31, and the first lens group 51 is mounted on an interior portion of the shelter 36. The second lens group 52 is mounted on a lens support 37 in the second barrel 32. A shutter 53 is provided in front of the second lens group 52.

Figure 2:
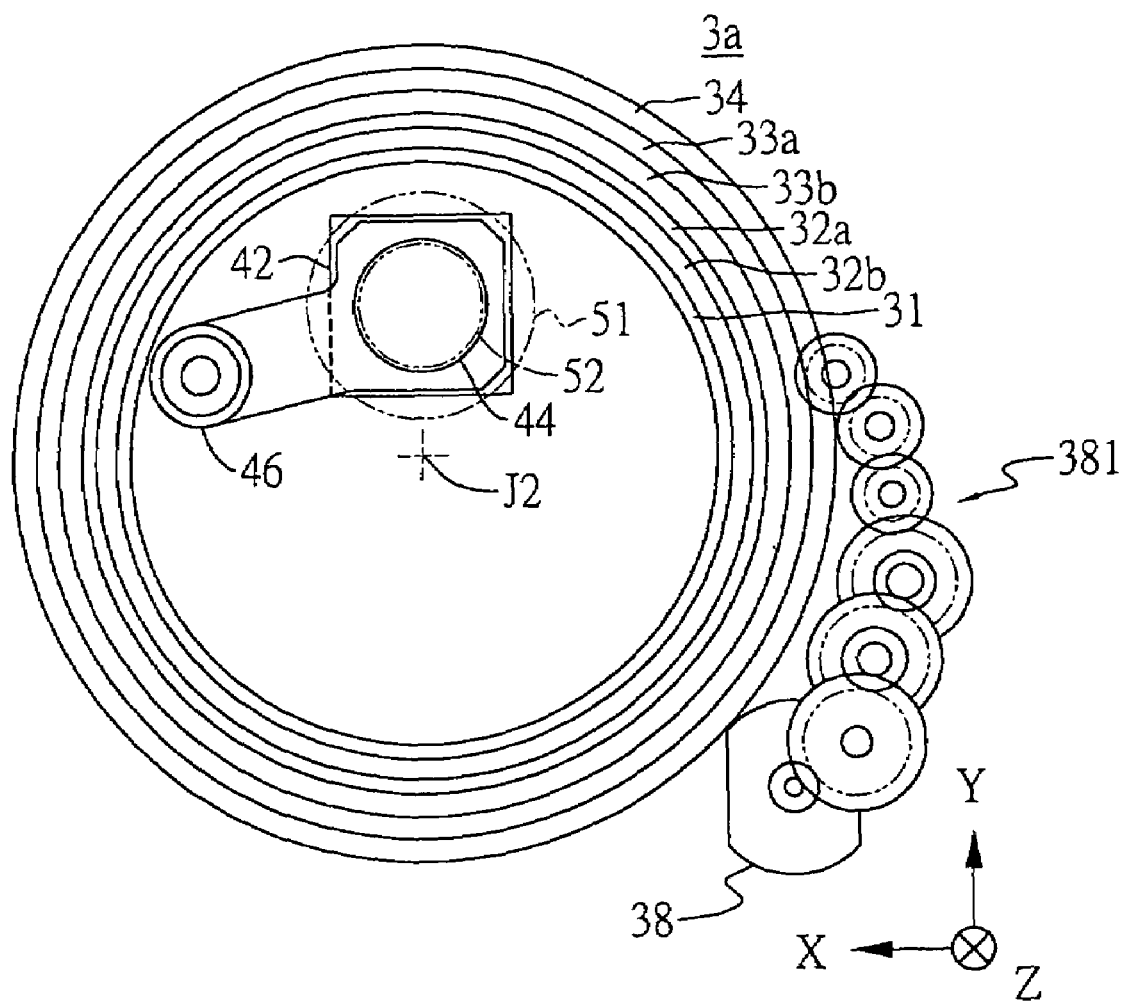
FIG. 2 schematically shows the periphery and interior of a lens unit of the digital camera disclosed in the invention.

FIG. 2 schematically shows the periphery and interior of lens unit 3a, viewing from (−Z) to (+Z). The shelter 36, lens support 37 and shutter 53 shown in FIG. 1 are ignored, and the lens groups 51, 52 are represented by the dashed lines.

As shown in FIG. 2, a focus motor 46 is positioned in the fixed barrel 34 and drives the focus lens 44 through a transmission (not shown). With reference to FIG. 1, when the focus motor 46 is actuated, the focus lens 44 is moved along the optical axis J1 back and forth.

As shown in FIGS. 1 and 2, a zoom motor 38 and a decelerating gear set 381 for zooming and collapsing are coupled with the fixed barrel 34. The decelerating gear set 381 decelerates the rotary speed of the zooming motor 38 and engages the gear 331 at the second outer tube 33a of the third barrel 33, as shown in FIG. 1. The driving gear (not numbered) of the decelerating gear set 381 engages with the second outer tube 33a of the third barrel 33 by using the opening of the fixed barrel 34. Thus, the third barrel is moved along the optical axis J1 while collapsing the lens.

In the digital camera 1 of the invention, the CCD 42, the shutter 53, the zoom motor 38 and the focus motor 46 are connected with a control unit (not shown in the figures) for controlling these components. For example, when a user operates the control unit to drive the zoom motor 38, the lens groups 51, 52 are moved along the optical axis J1 to alter the zoom ratio. Thereafter, the focus motor 46 is actuated to move the focus lens 44 so as to focus the image on the CCD 42. Finally, the image is captured by the CCD 42.

When the user turns off the digital camera 1, the first barrel 31, second barrel 32 and third barrel 33 are collapsed in the fixed barrel 34 by the zoom motor 38.

Figure 3:
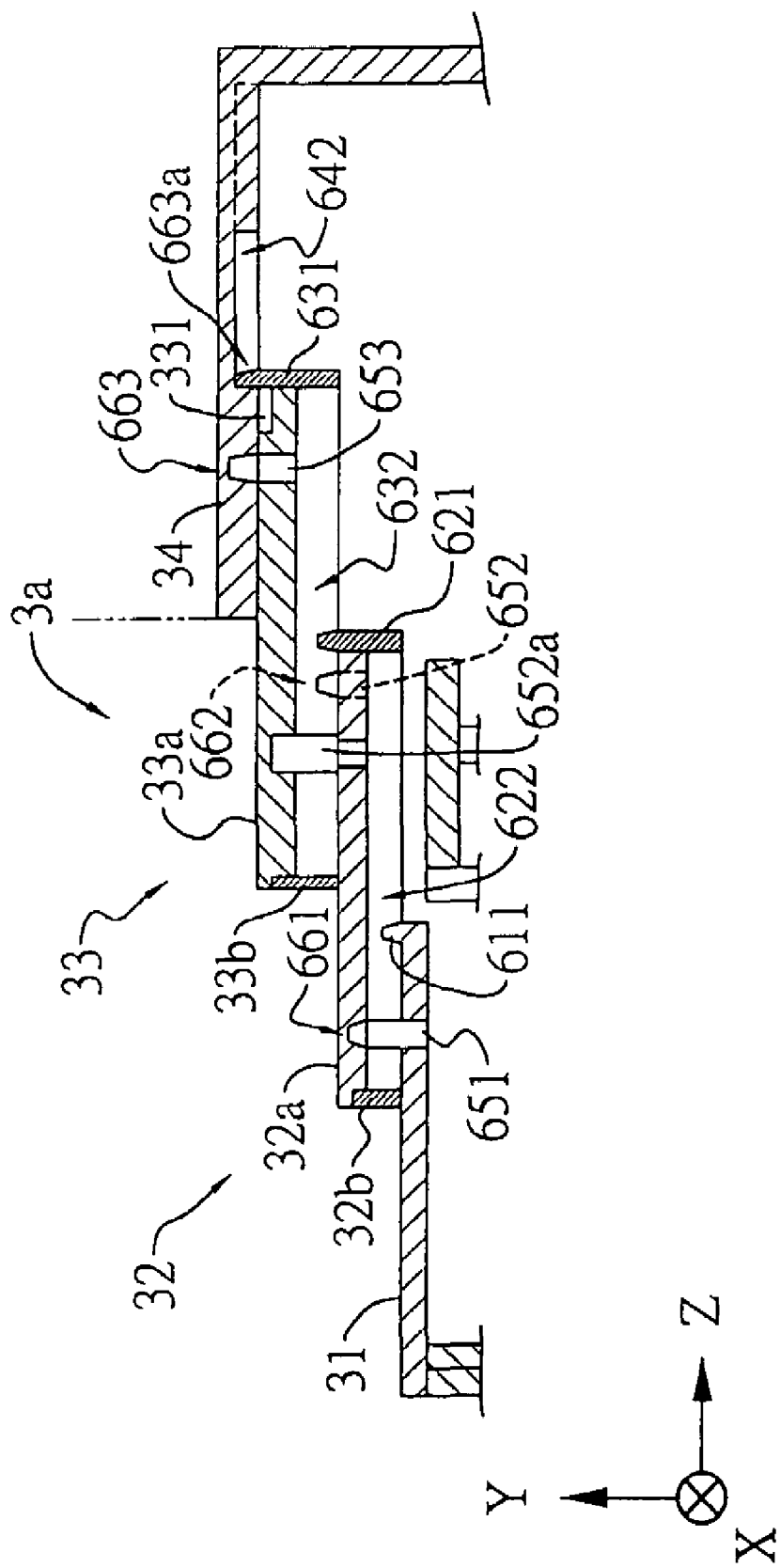
FIG. 3 is an enlarged view partially showing the cross-section of the lens unit.

The motions of the lens unit 3a driven by the zoom motor 38 will be described more detail hereinafter. FIG. 3 shows an enlarged cross sectional view of an upper part of the lens unit 3a including elements related to the motions.

The first barrel 31 has a first protrusion 611 formed at a rear end thereof, and adjacent the CCD 42 and extending outward. The first protrusion 611 is movably received in a first linear slot 622 parallel to the optical axis J1 and defined in the first inner tube 32b. Similarly, the second barrel 32 has a second protrusion 621 formed at a rear end of the first inner tube 32b, and adjacent the CCD 42 and extending outwards.

The second protrusion 621 is movably received in a second linear slot 632 parallel to the optical axis J1 and defined in the second inner tube 33b. The third barrel 33 has a third protrusion 631 formed at a rear end of the second inner tube 33b and extending outwards. The third protrusion 631 is received in a first cam slot 642 defined in the fixed barrel 34.

The first cam slot 642 is composed of a curved segment adjacent the CCD 42 and a linear segment away from the CCD 42. The third protrusion 631 and the first cam slot 642 constitute a first barrel-cam means 663a to enable the third barrel 33 to slide along the central axis J2 with respect to the fixed barrel 34, and the second inner tube 33b to rotate about the central axis J2 with respect to the fixed barrel 34. Thus, by the first protrusion 611 received in the first linear slot 622 and the second protrusion 621 received in the second linear slot 632, the first barrel 31 and the first inner tube 32b of the second barrel 32 can be rotated about the central axis J2 along with the second inner tube 33b of the third barrel 33.

Furthermore, the third barrel 33 has a first pin 653 formed on the second outer tube 33a and received in a second cam slot (not numbered) in the fixed barrel 34. The first pin 653 and the fixed barrel 34 constitute a second barrel-cam means 663. The decelerating gear set 381 and the gear 331 are mounted on the outer periphery of the second outer tube 33a of the third barrel 33. When the zooming motor 38 drives the second outer tube 33a to rotate, the third barrel 33 is slid along the central axis J2 with respect to the fixed barrel 34 by the second barrel-cam means 663.

The second outer tube 33a of the third barrel 33 is connected with the first outer tube 32a of the second barrel 32 by a second pin 652a to enable the second outer tube 33a to rotate about the central axis J2 along with first outer tube 32a of the second barrel 32. Moreover, the second pin 652a is fitted into a third linear slot (not numbered) of the second outer tube 33a of the third barrel 33, so the first outer tube 32a of the second barrel 32 can be slid along the central axis J2 with respect to the second outer tube 33a of the third barrel 33.

The first outer tube 32a of the second barrel 32 further has a third pin 652 formed thereon and fitted into a third cam slot (not numbered) defined in the second outer tube 33a of the third barrel 33. The third pin 652 and the second outer tube 33a constitute a third barrel-cam means 662. When the rotation of the second outer tube 33a of the third barrel 33 drives the first outer tube 32a of the second barrel 32 to rotate with respect to the second inner tube 33b of the third barrel 33, the second barrel 32 is slid along the central axis J2 with respect to the third barrel 33 by the third barrel-cam means 662.

The first barrel 31 has a fourth pin 651 formed thereon and received in a fourth cam slot (not numbered) defined in the first outer tube 32a of the second barrel 32. The first outer tube 32a and the fourth pin 651 constitute a fourth barrel-cam means 661. Because the first barrel (31) is slidable relative to the first inner tube (32b) of the second barrel (32) along a straight line, the first barrel 31 is slid along the central axis J2 with respect to the second barrel 32 by the fourth barrel-cam means 661 when the first outer tube 32a of the second barrel 32 is rotated about the first inner tube 32b.

As illustrated in FIG. 1, the lens support 37 has a fifth pin 372 fitted into the fourth cam slot of the first outer tube 32a of the second barrel 32. The first outer tube 32a and the fifth pin 372 constitute a fifth barrel-cam structure 664. The fifth pin 372 is also guided by a fourth linear slot 623 defined in the first inner tube 32b. Thus, in a situation of the first inner tube 32b of the second barrel 32 being fixed, when the first outer tube 32*a* is rotated, the second lens group 52 will be slid along the central axis J2 with respect to the second barrel 32.

FIGS. 1 and 3 illustrate the multiple barrel-cam means as described above and respectively provided at multiple positions (such as three positions) about the central axis J2, so the first barrel 31, second barrel 32, the third barrel 33 and the lens support 37 can be steadily slid.

Figure 4:
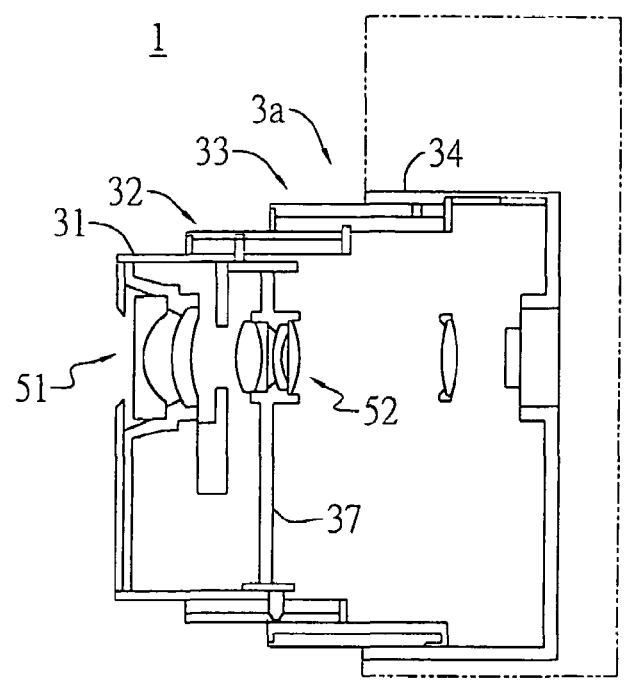
FIG. 4 is a schematic view showing the lens unit positioning at telephoto end (TELE)

FIG. 4 is a cross sectional view without hatched lines of the lens unit 3*a* telephoto end, and FIG. 1 is a cross sectional view of the lens unit 3*a* at wide-photo end.

As illustrated in FIGS. 1, 3 and 4, when the third barrel 33 is in the outermost position with respect to the fixed barrel 34 (the shoot position), the second inner tube 33*b* of the third barrel 33 is guided in the linear segment of the first cam slot 642 by the first barrel-cam means 663*a*. Thus, when the zoom motor 38 is actuated to zoom in on an object to be captured, the first barrel 31, the first inner tube 32*b* of the second barrel 32 and the second inner tube 33*b* of the third barrel 33 can not be rotated, and the first outer tube 32*a* of the second barrel 32 and the second outer tube 33*a* of the third barrel 33 are rotated along the central axis J2 to slide the third barrel 33 about the fixed barrel 34, the second barrel 32 about the third barrel 33 and the first barrel 31 about the second barrel 32. At the same time, the lens support 37 is slid about the second barrel 32, and the first lens group 51 and second lens group 52 are slid along the optical axis J1.

Figure 5:
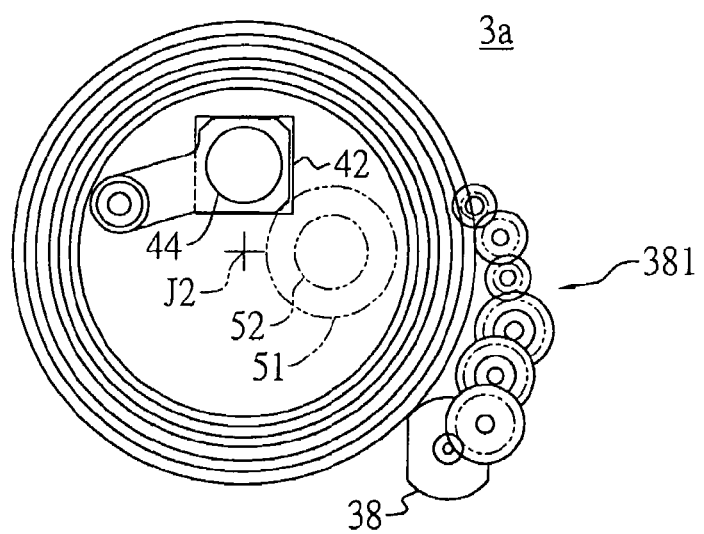
FIG. 5 is a schematic view showing the position of a first lens group and a second lens group while the lens unit is retracted.
Figure 6:
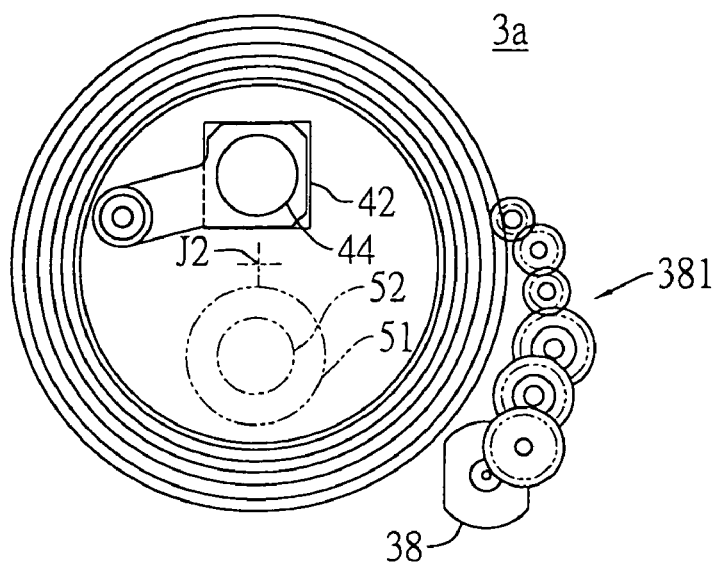
FIG. 6 is a schematic view showing the position of a first lens group and a second lens group after the lens unit is completely sunk in the housing of the digital camera.
Figure 7:
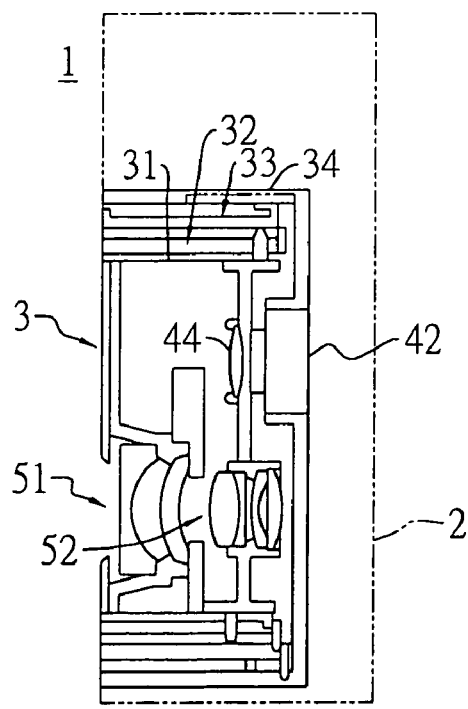
FIG. 7 is a cross-sectional view of the digital camera after sinking the lens unit in the housing of the digital camera.

FIGS. 5 and 6 illustrate the rotation of the first lens group 51 and second lens group 52 while the lens unit 3*a* is retracted, and FIG. 7 is a cross sectional view of the digital camera 1 after sinking the lens unit 3*a* in the housing 2 of the digital camera 1. As illustrated in FIGS. 5 and 6, by the rotation of the first barrel 31 and the first inner tube 32*b* of the second barrel 32, the first lens group 51 and the second lens group 52 are rotated around the central axis J2 at an angle of 180°. Referring to FIG. 7, the second lens group 52 is retracted to a position beneath the CCD 42.

In detail, as shown in FIG. 2, the zoom motor 38 drives the second outer tube 33*a* of the third barrel 33 to rotate. As shown in FIG. 3, the third barrel 33 is retracted into the fixed barrel 34 by the second barrel-cam means 663 between the third barrel 33 and the fixed barrel 34, and the second inner tube 33*b* is rotated at the angle of 180° to approach the CCD 42 by means of the first pin 653 of the second inner tube 33*b* of the third barrel 33 being moved along the curved segment of the first cam slot 642 (e.g. by the first barrel-cam means 663*a*). Thus, the first inner tube 32*b* of the second barrel 32 and the first barrel 31 moved along with the inner tube 32*b* of the third barrel 33 are also rotated around the central axis J2 at the angle of 180° degree.

The rotation of the second outer tube 33*a* of the third barrel 33 drives the first outer tube 32*a* of the second barrel 32 to rotate by the second pin 652*a*, and the second barrel 32 is retracted into the third barrel 33 by the third barrel-cam means 662 between the first outer tube 32*a* of the second barrel 32 and the second inner tube 33*b* of the third barrel 33. Furthermore, the rotation of the first outer tube 32*a* of the second barrel 32 drives the first barrel 31 to retract into the second barrel 32 by a fourth barrel-cam means 661 between the first barrel 31 and the first outer tube 32*a* of the second barrel 32. Therefore, the first lens group 51 and second lens group 52 are retracted together and rotated around the central axis J2 from the optical axis J1 to the position beneath the CCD 42 and the focus lens 44.

After sinking in the camera body, an overall length of the lens unit 3*a* along the central axis J2 (or the lens frame 3) is shortened to the length sum of the first lens group 51 and second lens group 52. Namely, the switched-off digital camera 1 achieves its slimmest condition. According to the sizes of the lens groups and the CCD 42, the method, which rotates the first lens group 51 and second lens group 52 without moving the focus lens 44 as described above, is a preferable way to achieve the slimmest condition of the digital camera 1.

The conventional method moves only the second lens group 52 to a position beside the CCD 42. However, referring to FIG. 1 of the present invention, the first lens group 51 and second lens group 52 have the synchronous movement to maintain the optical axes of the lens groups 51, 52 in alignment with each other at all time, and the optical performance of the digital camera 1 is always great. Even after long term use of the camera whereby the retracting motion of the lens frame 3 may have caused the components to have become worn, the first lens group 51 and second lens group 52 still maintain their optical axes coaxial, and the optical performance of the digital camera 1 is also maintained.

Because the first barrel-cam means 663*a* is driven by the zoom motor 38 as a power source to retract the lens frame and rotate the first lens group 51 and second lens group 52 (e.g. the lens frame (3)), the digital camera 1 does not need to have another power source, and thus has a simple structure.

While the preferred embodiment of the present invention has been described, it is to be understood that modifications will be apparent to those skilled in the art without departing from the spirit of the invention.

The invention does not limit the optical system of the digital camera 1 to three lens groups. No matter how many lens groups the optical system includes, the digital camera can maintain the optical performance. For example, by moving the objective lens group(s) (e.g. the first lens group 51 and second group 52 in the preferred embodiment described above) beside the CCD 42, the digital camera is particularly slim.

In addition, the objective lens group may not rotate with other lens groups. If the lens frame has enough space to contain other actuating means, the objective lens group will be moved along the optical axis J1 and rotated around a central axis J2. Moreover, the objective lens set can also be located above the CCD 42 (along the direction of the Y reference axis), or at the left or right side of the CCD 42 (along the direction of the X reference axis or the opposite thereof).

The lens frame preferably has a simple structure including three movable barrels or two movable barrels.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital camera comprising:
    a plurality of lens groups having an optical axis, and moving in the optical axis to change relative positions of the lens groups;
    a collapsible lens barrel loaded with the lens groups;
    an image sensor receiving beams traveling through the lens groups and generating an image signal; and an evading mechanism carrying front parts of the lens groups to rotate about a rotary axis parallel to the optical axis and locating front parts beside the image sensor when the collapsible lens barrel is retracted in the digital camera, wherein the lens groups comprises a first lens group, a second lens group and a third lens group sequentially from an objective side, and the front parts of the lens groups is composed of the first and second lens groups.

2. The digital camera as claimed in claim 1, wherein the third lens group is a focus lens.

3. The digital camera as claimed in claim 1 or 2, wherein the rotary axis is a central axis of the collapsible lens barrel, and the first and second lens groups are rotated about the rotary axis when the collapsible lens barrel is retracted in the digital camera.

4. The digital camera as claimed in claim 3 further comprising a motor, which drives the lens groups to move back and forth in the optical axis during operation, and retracts the collapsible lens barrel in the digital camera by rotating about the rotary axis after turning off the digital camera.

5. The digital camera as claimed in claim 4 further comprising a fixed barrel to support the collapsible lens barrel, so that the evading mechanism is a barrel-cam mechanism between the collapsible lens barrel and a fixed barrel.

6. The digital camera as claimed in claim 5, wherein the collapsible lens barrel includes a first barrel containing the first lens group, a second barrel containing the second lens group and the first barrel, and a third barrel containing the second barrel and held by the fixed barrel.

* * * * *